Figure 1:
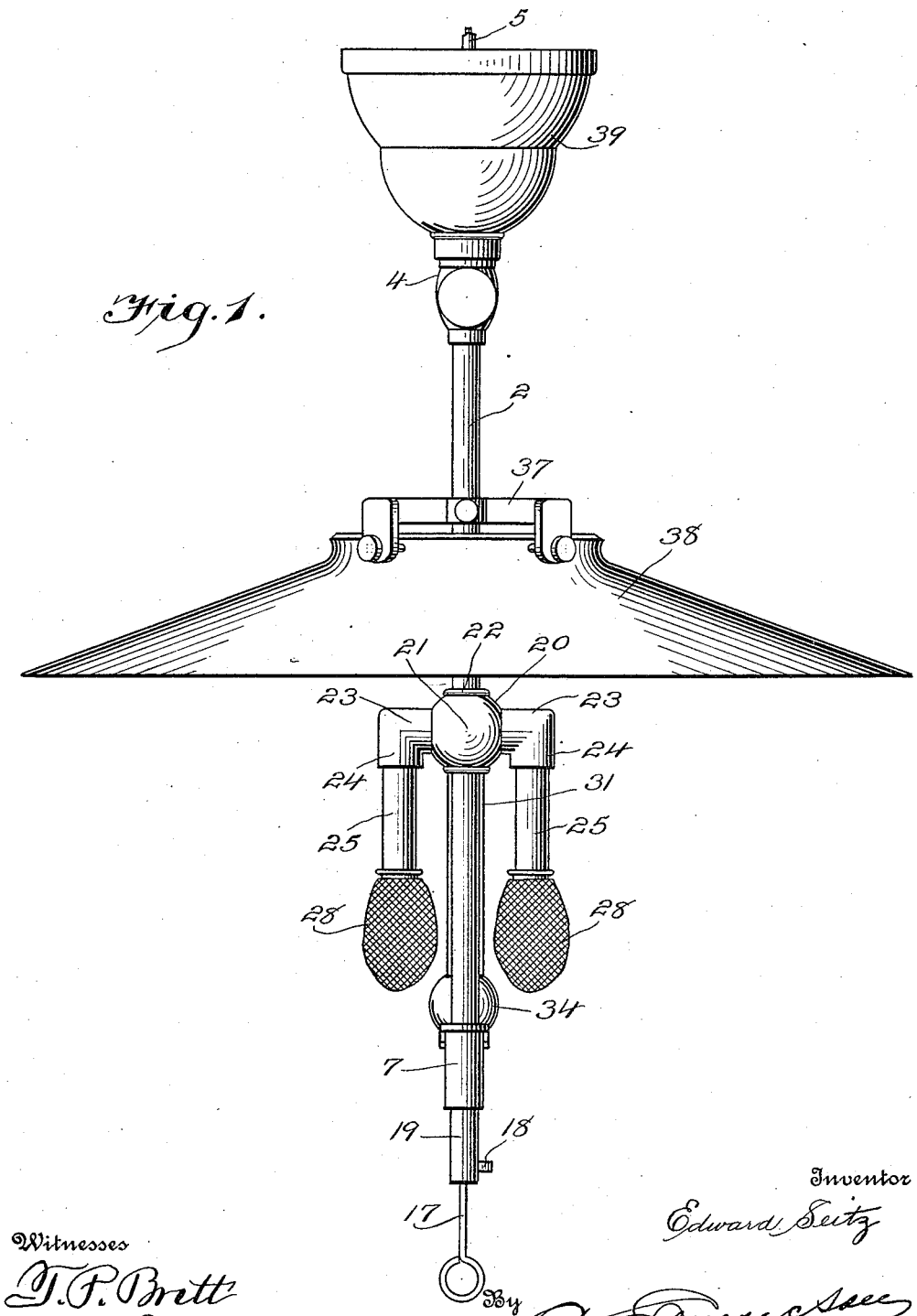

E. SEITZ.
INCANDESCENT LAMP.
APPLICATION FILED MAY 24, 1912.

1,052,756.

Patented Feb. 11, 1913.
3 SHEETS—SHEET 1.

Witnesses
T. P. Britt
C. C. Duffy

Inventor
Edward Seitz
By
Attorneys

E. SEITZ.
INCANDESCENT LAMP.
APPLICATION FILED MAY 24, 1912.

1,052,756.

Patented Feb. 11, 1913.
3 SHEETS—SHEET 3.

Witnesses
T. F. Britt
E. C. Duffy

Inventor
Edward Seitz

By
Attorneys

UNITED STATES PATENT OFFICE.

EDWARD SEITZ, OF PEORIA, ILLINOIS, ASSIGNOR OF ONE-HALF TO JAMES E. LOCKWOOD, OF PEORIA, ILLINOIS.

INCANDESCENT LAMP.

1,052,756.

Specification of Letters Patent.   Patented Feb. 11, 1913.

Application filed May 24, 1912.   Serial No. 699,409.

*To all whom it may concern:*

Be it known that I, EDWARD SEITZ, a citizen of the United States, residing at Peoria, in the county of Peoria and State of Illinois, have invented certain new and useful Improvements in Incandescent Lamps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to incandescent lamps but more particularly to a liquid fuel incandescent lamp; and the invention has for its object to provide a liquid fuel incandescent lamp employing preferably stove gasolene as a fuel which is so constructed and arranged that the lamp will at all times burn economically, evenly and without sputtering or flickering and wherein a maximum amount of light can be obtained from a minimum amount of fuel.

A further object of the invention is to provide a liquid fuel incandescent lamp which is so constructed and arranged that the lamp can be manufactured and assembled at a very slight cost; and a further object of the invention is to provide a liquid fuel incandescent lamp which is constructed of simple mechanical devices so that the parts can be easily replaced or renewed and are not liable to breakage and deterioration.

With this and other objects in view the invention consists in the novel construction of the parts of the lamp; and the invention further consists in the novel arrangement and construction for taking atmospheric air into the gas during its passage to the incandescent mantle.

The invention further consists in the novel construction and arrangement which provides for an efficient heating of liquid fuel by the incandescent mantle when the lamp is in operation.

The invention further consists in the novel construction of the mixing chamber in which the gas and atmospheric air is mixed before reaching the mantle or mantles.

The invention further consists in the novel construction of the needle valve casting in such manner that the same can be quickly and easily disassembled for cleaning.

The invention further consists in certain other novel details of construction and in combinations of parts, all of which will be first fully described and afterward specifically pointed out in the appended claims.

Figure 2:
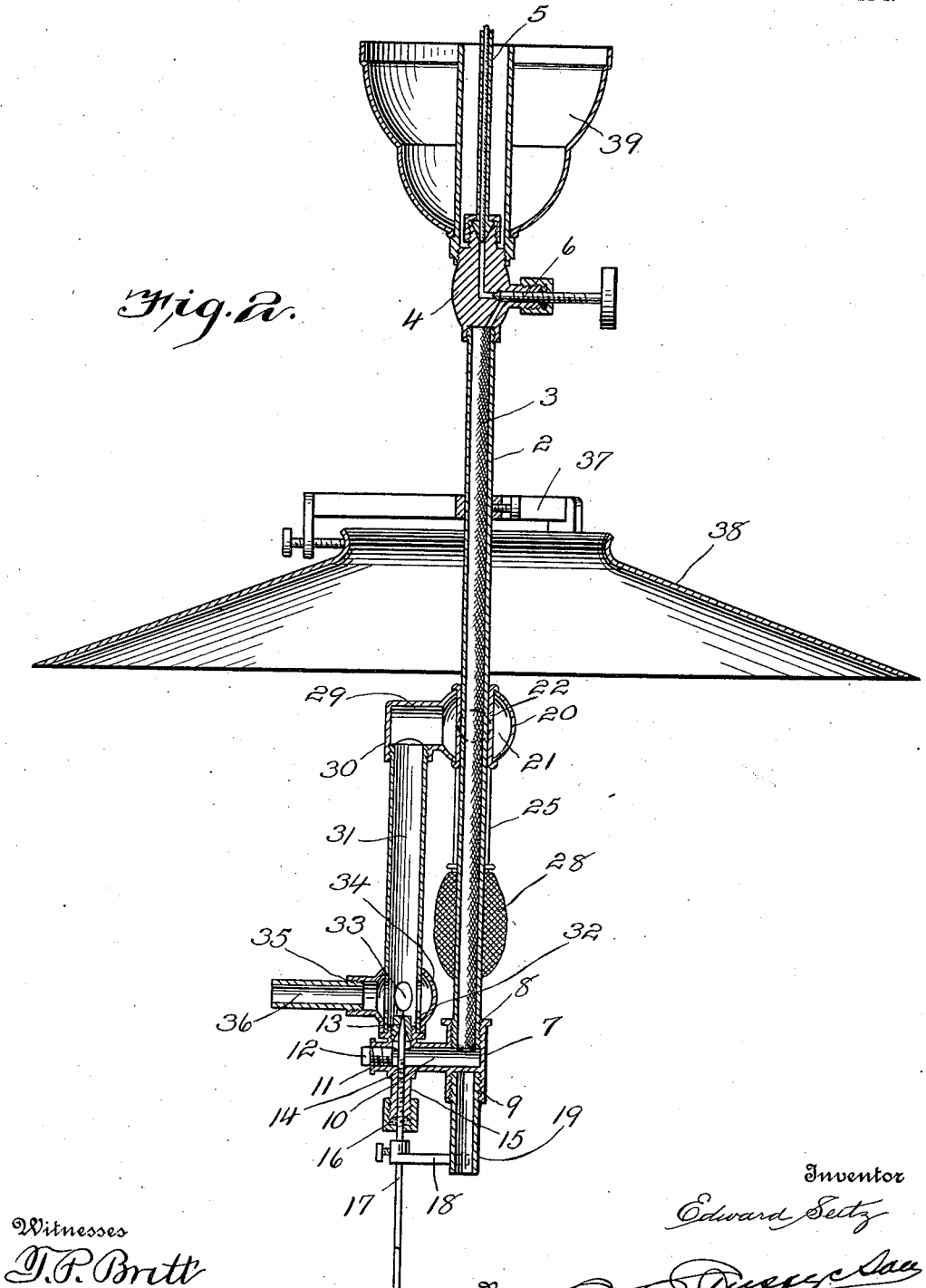
Figure 3:
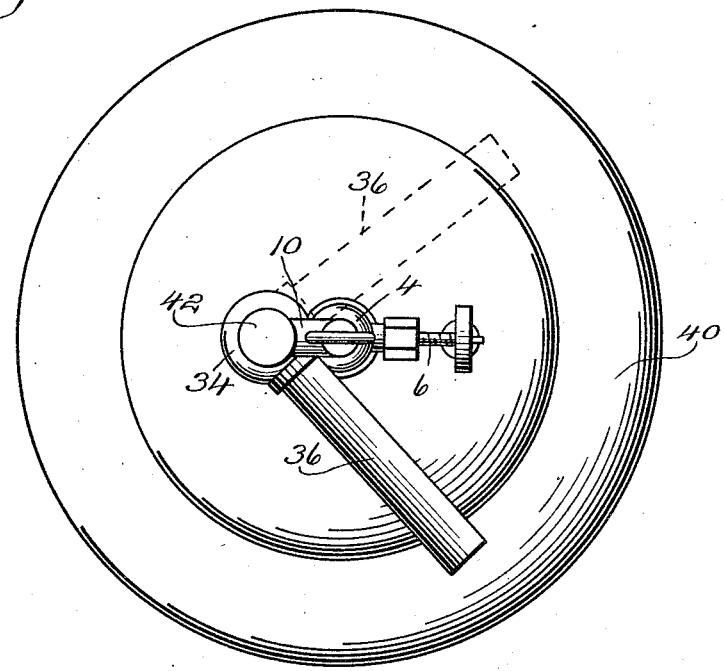
Figure 4:
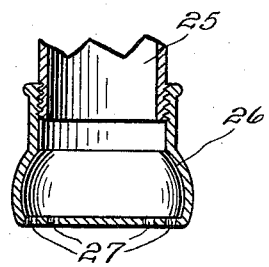
Figure 5:
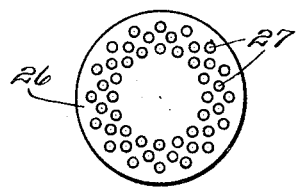

Referring to the accompanying drawings: Figure 1 is an elevation of an incandescent liquid fuel lamp constructed in accordance with this invention. Fig. 2 is a vertical sectional view taken through Fig. 1. Fig. 3 is a top plan view illustrating the lamp construction, the shade and dome being removed. Fig. 4 is a fragmentary detail sectional view of the lower end of the mantle holding tube, and Fig. 5 is an end view of the same.

Like numerals of reference indicate the same parts throughout the several figures in which:

1 indicates the lamp which comprises the vertical pipe 2 preferably filled with a suitable straining material 3 such as asbestos or the like in order to prevent passage of dirt and foreign matter to the needle valve. As will appear in Figs. 1 and 2 the vertical pipe 2 is threaded into a valve casing 4 at the upper end thereof, which valve casing 4 connects with the supply tube 5 by means of which tube the liquid fuel is led to the lamp, a valve 6 being arranged in the valve casing 4 for the purpose of shutting off the supply of liquid fuel to the lamp.

At the lower end of the pipe 2 is the needle valve casting 7 which comprises the vertical threaded passage 8 and the vertical threaded opening 9 arranged oppositely to each other, the vertical pipe 2 being threaded into the threaded passage 8 as shown in Fig. 2. Leading horizontally from the vertical passage 8 is the horizontal passage 10 which is closed at the extreme end 11 by a threaded plug 12, said threaded plug being readily removable in such manner as to allow free access to the interior of the casting 7. Arranged vertically in the casting 7 and above the horizontal passage 10 is the needle valve seat 13 which receives the needle valve 14, said needle valve threading into the vertical boss 15 which is provided with a packing gland 16 in order to effectually pack the valve against leakage. Upon the stem 17 of the needle valve is a horizontal arm 18 which engages the depending pipe 19 in such manner as to limit the movement of the said valve stem 17.

Slidably mounted on the pipe 2 is the mixing chamber 20, said mixing chamber comprising a preferably globular central chamber 21 having a sleeve 22 arranged centrally therein in such manner as to prevent all leakage from the chamber 21 around the pipe 2 and to provide an easy sliding movement between the two members. As will appear from Fig. 1 two arms 23 extend oppositely and horizontally from the central globular chamber 21, which arms 23 are turned at right angles at 24 to receive the mantle holding tubes 25, said mantle holding tubes 25 being provided at their lower ends, as shown in Figs. 4 and 5, with an enlarged cap 26 perforated at 27 around which cap the incandescent mantles 28 are securely fastened in any approved or convenient manner.

Referring to Fig. 2 it will be seen that an arm 29 extends from the central globular chamber 21 at right angles to the extending arms 23 which arm 29 is also turned at right angles at 30 to receive the air and gas mixing tube 31, said air and gas mixing tube 31 having an open end 32 which fits down over the needle valve seat 13 in the manner shown in Fig. 2; while the said air and gas mixing tube 31 is provided near its lower end and at a point above the needle valve with a plurality of air openings 33.

Slidably and rotatably mounted on the air and gas mixing tube 31 is a globular chamber 34 having a threaded passage 35 extending horizontally therefrom to receive an air pipe or tube 36, said pipe or tube and globular chamber 34 being slidable and rotatable on the air and gas mixing tube 31 for a purpose which will be hereinafter fully described.

Mounted on the pipe 2 above the mantles 28 is a shade holder 37 to which a shade 38 is secured, while a suitable bell 39 is arranged above the valve 6 at the upper end of the pipe 2 in order to provide an artistic finish to the lamp.

Having thus described the several parts of this invention its operation is as follows: The fuel passes to the fixture, through the feed pipe 5, through the valve 6 and into the pipe 2 in which pipe is contained, as before stated, a suitable straining material through which the fuel passes. At the end of the pipe 2 the fuel enters the valve casting 7 and flows into the horizontal passage 14 in said casting and thence through the needle valve into the air and gas mixing tube 31. In order to operate the lamp a torch or other heating apparatus is applied to the needle valve casting 7 and the lower portion of the device in order to vaporize the liquid fuel passing into the valve casting 7. As the gas enters the air and gas mixing tube 31 a sufficient quantity of air is drawn into the tube 31 through the perforations 33, the air passing first into the pipe 36 and into the globular air chamber 34 passes upwardly into the globular mixing chamber 20 and from said chamber down through the pipes 25 to the mantles 28 at which point the gas is ignited in order to render the said mantles incandescent.

As before stated the globular mixing chamber 20, the mantles and the air and gas mixing tube 31 are all slidable on the pipe 2 in such manner that access can be quickly had to the needle valve in order to clean the same or for any other necessary purposes; while the globular air chamber 34 is slidable on the air and gas mixing tube 31 in order to diminish the area of the perforations 33, while the said globular air chamber 34 and pipe 36 are also rotatable on the said air and gas mixing tube 31 so that the air can be drawn into the pipe 36 at a point which is most remote from the mantles 28. This is a material feature of this construction for the reason that it is necessary that the air passing into the air and gas mixing tube 31 be not drawn from the immediate vicinity of the incandescent mantles 28 as the air so heated from close proximity to the mantles 28 is devoid of a major portion of its oxygen which renders the same unfit for mixing with the gas passing through the needle valve. As will of course be apparent the heat generated by the mantles 28 is sufficient to keep the lower portion of the pipe 2 and the needle valve casting 7 in a sufficiently heated condition to vaporize liquid fuel passing to the needle valve.

Having thus fully described the invention it is of course apparent that certain changes may be made therein which will fall within the limit and scope of this invention, and I consider myself clearly entitled to all such changes as fall within the terms of the following claims.

What I claim as new and desire to secure by Letters Patent of the United States is:—

1. An incandescent lamp of the character described comprising a vertical pipe through which the liquid fuel is led, said vertical pipe being provided with a suitable straining material within the same, a valve disposed in said pipe to cut off the supply of fuel therefrom, a needle valve casting arranged at one end of said pipe, said needle valve casting comprising a horizontal chamber open at one end and provided with a plug to close the opening in such manner that the said horizontal chamber and needle valve casting can be readily cleaned, a needle valve seat arranged at right angles to said horizontal chamber, a boss arranged on said needle valve casting to receive the threaded needle valve stem, means for packing said needle valve stem to prevent leakage, a pipe entering said needle valve castage and extending in the direction of the said needle valve stem, an arm arranged on said needle valve stem for engagement with said pipe to limit the movement of said needle valve stem, an air and gas mixing chamber, said chamber being globular in form and rotatable relatively to the said needle valve casting, a pipe entering said mixing chamber and extending a distance therefrom in order to receive air at a point remote from the said chamber, a mantle tube communicating with said chamber and an incandescent mantle arranged on said tube, substantially as described and for the purposes set forth.

2. An incandescent lamp of the character described comprising a vertical pipe through which the liquid fuel is led, said vertical pipe being provided with a suitable straining material within the same, a needle valve casting arranged at one end of said pipe, said needle valve casting comprising a horizontal chamber open at one end and provided with a plug to close the opening in such manner that the said horizontal chamber and needle valve casting can be readily cleaned, a needle valve seat arranged at right angles to said horizontal chamber, a boss arranged on said needle valve casting to receive the threaded needle valve stem, means for packing said needle valve stem to prevent leakage, a pipe entering said needle valve casting and extending in the direction of the said needle valve stem, an arm arranged on said needle valve stem for engagement with said pipe to limit the movement of said needle valve stem, an air and gas mixing chamber, said chamber being globular in form and rotatable relatively to the said needle valve casting, a pipe entering said mixing chamber and extending a distance therefrom in order to receive air at a point remote from the said chamber, a mantle tube communicating with said chamber and an incandescent mantle arranged on said tube, substantially as described and for the purposes set forth.

3. An incandescent lamp of the character described comprising a vertical pipe through which the liquid fuel is led, a needle valve casting arranged at one end of said pipe, said needle valve casting comprising a horizontal chamber open at one end and provided with a plug to close the opening in such manner that the said horizontal chamber and needle valve casting can be readily cleaned, a needle valve seat arranged at right angles to said horizontal chamber, a boss arranged on said needle valve casting to receive the threaded needle valve stem, means for packing said needle valve stem to prevent leakage, a pipe entering said needle valve casting and extending in the direction of the said needle valve stem, an arm arranged on said needle valve stem for engagement with said pipe to limit the movement of said needle valve stem, an air and gas mixing chamber, said chamber being globular in form and rotatable relatively to the said needle valve casting, a pipe entering said mixing chamber and extending a distance therefrom in order to receive air at a point remote from the said chamber, a mantle tube communicating with said chamber and an incandescent mantle arranged on said tube, substantially as described and for the purposes set forth.

4. An incandescent lamp of the character described comprising a pipe through which the fuel is led, a valve casting at one end of said pipe, said valve casting being provided with a horizontal chamber therein open at one end, a plug for closing said open end, a needle valve seat, a needle valve and stem, an air and gas mixing chamber to receive the gas therefrom, an air chamber rotatable relatively to the said valve casting, the end of said chamber being remote from the said needle valve to receive air at a point remote from the said needle valve, a globular mixing chamber arranged to receive the air and gas, said globular mixing chamber being slidably arranged on the said pipe leading the fuel, a mantle holding tube communicating with said globular mixing chamber, and an incandescent mantle on said tube, substantially as described.

5. An incandescent lamp of the character described comprising a pipe through which the fuel is led, a valve casting at one end of said pipe, said valve casting being provided with a horizontal chamber therein, a needle valve seat, a needle valve and stem, an air and gas mixing chamber to receive the gas therefrom, an air chamber rotatable relatively to the said valve casing, the end of said chamber being remote from the said needle valve to receive air at a point remote from the said needle valve, a globular mixing chamber arranged to receive the air and gas, said globular mixing chamber being slidably arranged on the said pipe leading the fuel, a mantle holding tube communicating with said globular mixing chamber, and an incandescent mantle on said tube, substantially as described.

6. An incandescent lamp of the character described comprising a pipe through which the fuel is led, a valve casting at one end of said pipe, said valve casting being provided with a horizontal chamber therein, a needle valve seat, a needle valve and stem, an air and gas mixing chamber to receive the gas therefrom, an air chamber rotatable relatively to the said valve casting, a globular mixing chamber arranged to receive the air and gas, said globular mixing chamber being slidably arranged on the said pipe leading the fuel, a mantle holding tube communicating with said globular mixing chamber, and an incandescent mantle on said tube, substantially as described.

7. An incandescent lamp comprising a pipe to lead the fuel, a needle valve receiving the fuel from said pipe, an air and gas mixing chamber, a globular air chamber rotatable relatively to the said needle valve, a globular air and gas mixing chamber slidably arranged on said pipe, a mantle supporting tube communicating with said globular mixing chamber, and a mantle on said mantle supporting tube, substantially as described.

In testimony whereof, I affix my signature, in presence of two witnesses.

EDWARD SEITZ.

Witnesses:
CHAS. H. KIMMEL,
CHRISTOPHER HARRIGAN.

Copies of this patent may be obtained for five cents each, by addressing the "Commissioner of Patents, Washington, D. C."